July 27, 1954  F. F. KOLBE ET AL  2,684,753
MAGNETIC DRIVE FOR CONVEYER BELTS
Filed May 10, 1952
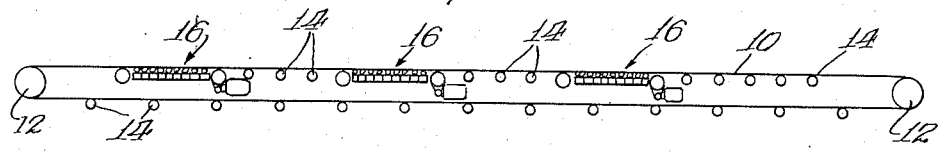
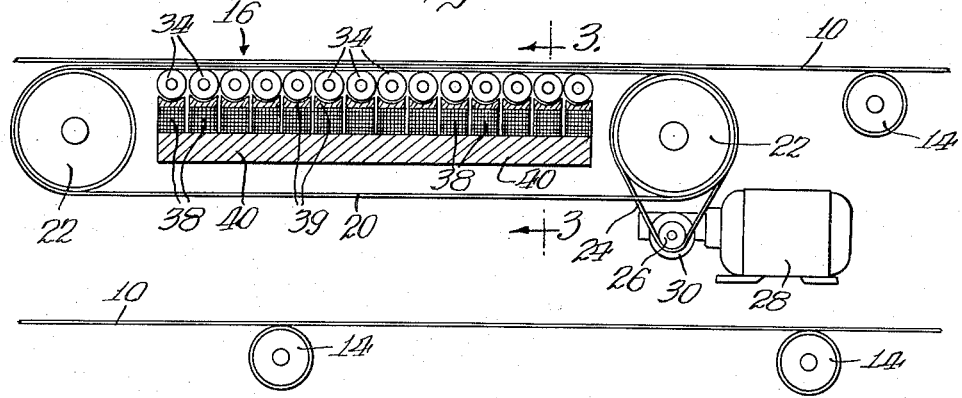
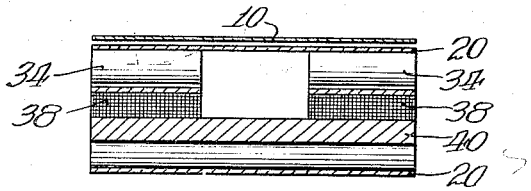
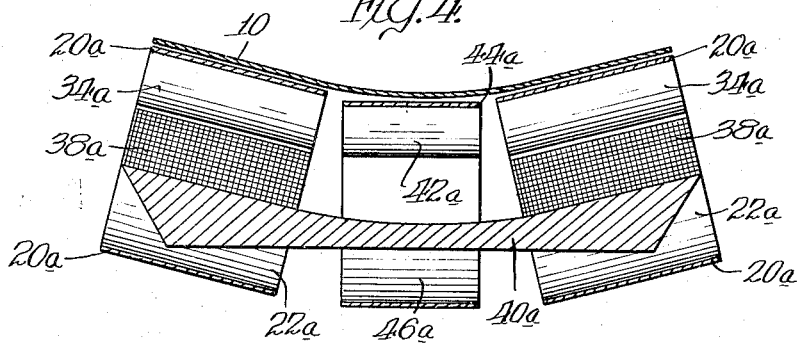
INVENTORS.
Frank F. Kolbe
Laddie L. Broun
BY Brown, Jackson,
Boettcher & Diemer
Attys.

Patented July 27, 1954

2,684,753

UNITED STATES PATENT OFFICE 2,684,753

MAGNETIC DRIVE FOR CONVEYER BELTS

Frank F. Kolbe and Laddie L. Brown, Chicago, Ill., assignors to The United Electric Coal Companies, Chicago, Ill., a corporation of Delaware Application May 10, 1952, Serial No. 287,226

3 Claims. (Cl. 198—203)

The present invention relates to conveyors and to means for driving same and is particularly directed to magnetic drives for steel conveyor belts.

Fabric and composition conveyor belts have long been used in many industries for transporting materials. Conveyors are particularly well adapted to modern mass production and provide substantial advantages over other methods and means of material transfer. Fabric and composition belts are, however, subject to wear and fraying due to the rubbing of the edges of the belt against side guiding members, misalignment of the belt upon its supporting rollers, wear and strain imposed by the material being transferred, and so on. A further disadvantage of fabric and composition belts is that they stretch during use, necessitating the utilization of belt tighteners and the like.

To overcome the stated disadvantages of fabric and composition belts, metallic belts and composition belts with a metallic base have been proposed and are rapidly coming into use in various industries. Metallic belts present various problems with regard to the driving thereof, which problems are exaggerated by the desire in many industries to increase the length and size of various conveyor runs. While short lengths of belt may be conveniently driven in a conventional manner by rotating one of the support and guide rollers therefor, long lengths of belt, particularly metallic belt, cannot be efficiently and economically driven in this manner. The problem of driving the conveyors has resulted in a curtailment of the length of individual runs and of the adoption of metallic belts.

An object of the present invention is to overcome the stated problem by providing efficient and economical means for driving conveyor belts of any desired length of run, which means exert tractive drive effort substantially uniformly throughout the belt rather than at a localized point, as has been customary.

Bearing in mind that short conveyor runs, not required to support substantial load, may readily be driven by one of the rollers supporting and guiding same, it is an object of the present invention to provide conveyor belt driving means in the form of a plurality of small endless belt units, the belts of the individual units being driven in a conventional manner and having tractive cooperation with the main conveyor belt.

Since steel and ferrous metals, due to their resistance to wear and stretching, are best adapted for use as conveyor belts, a more particular object of the present invention is to provide drive means of the character described, wherein tractive cooperation between the individual drive belts and the main belt is attained magnetically. Accordingly, an object of the present invention is the provision of a magnetic drive for ferrous conveyor belts.

A further object of the present invention is the provision of individual units for magnetically driving a steel conveyor belt, each unit comprising a relatively short endless ferrous metal belt, rollers for supporting the belt, means for driving the belt, and a plurality of electro-magnets adapted to create a magnetic field passing through the belt of the unit and the conveyor belt so as to attract the two belts to one another and effect substantially positive engagement therebetween.

Other objects and advantages of the present invention will become apparent from the following detailed description of a preferred embodiment of the invention, wherein reference is made to the accompanying drawings, in which:

Figure 1 is a schematic side elevation of a steel conveyor belt and a plurality of magnetic drive units therefor;

Figure 2 is an enlarged side elevation of one drive unit, showing portions of the unit in cross section;

Figure 3 is a cross sectional view taken substantially on the line 3—3 of Figure 2; and Figure 4 is a cross sectional view, similar to Figure 3, on an enlarged scale, of a second embodiment of the drive unit of the present invention.

Referring now to the drawings, and particularly to Figures 1, 2 and 3, a steel conveyor carrier belt is indicated at 10, which may be of any suitable or desired length and which is supported and guided at its ends by a pair of main support rollers 12. The carrier belt 10 is reaved over and guided by the rollers 12 and a plurality of smaller support rollers 14 disposed beneath each run of the belt. The carrier belt 10 is adapted to be driven magnetically by a plurality of magnetic drive units 16 of the present invention.

Each of the drive units 16 comprises an endless traction belt 20 suitably reaved over and guided by a pair of end rollers 22. One of the rollers 22 is provided with a sheave adapted for the reception of a pulley belt 24, reaved over the sheave and over a pulley 26 adapted to be driven by an electric motor 28 provided with a standard gear reducer 30. In certain instances, wherein the load on the carrier belt 10 or on the traction belt 20 is substantial, suitable gears may be substituted for the sheave on the roller and for the pulley 26 and there may be substituted for the pulley belt 24 a chain engaged with the gears in a customary manner. Each of the units 16 is so disposed that one run of the traction belt 20 is in engagement with one run of the carrier belt 10. As is shown in the drawings and as is preferable, the upper run of the traction belt 20 is in engagement with the lower surface of the upper or load-carrying run of the carrier belt 10.

Between the end or main rollers 22 of each drive unit 16, the carrier belt 10 and the traction belt 20 are supported by a plurality or rollers 34. The rollers may be disposed in any desired arrangement as will appear more fully hereinafter, but as is shown in Figure 3, the rollers 34 may simply be disposed in two parallel rows with their axes parallel to the horizontal plane of the belts 10 and 20. Disposed immediately below each of the rollers 34 is an electro-magnetic roll 38 wound about an armature 39, the armature having an arcuate upper face conforming substantially to the peripheral curvature of the rollers 34. Each of the electro-magnets is mounted upon and magnetically connected at one side thereof by means of an iron bridge 40.

While the drawings and the previous description are directed solely to the apparatus of the present invention, it will be appreciated that the carrier belt 10 and the drive units 16 may be supported in any conventional manner in the relationships stated. For example, the axles of the supporting rollers 12 and 14 for the carrier belt 10 may be suitably secured to a conventional supporting ladder for the carrier belt 10. The support rollers 22 and 34 of each of the drive units 16 are preferably mounted on brackets suitably secured in any conventional manner to the supporting ladder for the carrier belt 10. The iron bridge carrying the electro-magnets 38 may also be mounted on a bracket suitably secured to the supporting ladder for the carrier belt 10. If preferred, the rollers 22 and 34 of each drive unit 16, and the motor 28 and bridge 40, may be supported together and adapted to be secured as a unit to the supporting ladder for the carrier belt.

To provide a magnetic attraction between the carrier belt 10 and the traction belt 20 of each unit, the belts 10 and 20 are preferably formed of steel of a high magnetic permeability and the rollers 34 and the iron bridge 40 are also magnetically permeable. Hereinafter, for convenience, the magnetically permeable belts 10 and 20, rollers 34 and bridge 40 are sometimes referred to as "magnetic." The coils 38 of the electro-magnets are preferably layer wound D. C. shunt coils connected in parallel. Accordingly, the magnetic circuit or flux path between the electro-magnets 38, at one side therof, will be through the iron bridge 40 and, at the opposite side thereof, will pass directly through the carrier belt 10 and the traction belt 20 to effectively lock the two belts together for simultaneous movement. In view of the foregoing, it will be appreciated that the present invention essentially comprises a steel traction belt adapted to be brought into engagement with a steel carrier belt, supporting means for the belts and spaced magnetic means having a flux path therebetween passing through the traction belt and the carrier belt.

The motor 28 of each of the units 16 is preferably an alternating current motor having a power source separate from the electro-magnets 38 and may be provided with any suitable control means to vary the speed of operation thereof.

In instances wherein the carrier belt 10 is curved, as when supported by inclined rollers so that the belt presents a concave carrying surface, the rollers 34 should be inclined so that the drive belt 20 conforms to the carrier belt 10. However, when a plurality of drive units 16 are utilized with a concave carrier belt, it is impractical to provide cylindrical end rollers for the belt 20 since same would result in flexation of the belts 10 and 20 to planar surfaces at each end of each drive unit. Accordingly, revision of the embodiment of the invention shown in detail in Figure 3 is required.

Referring now to Figure 4, a second embodiment of the drive unit of the invention, particularly adapted for use with concave carrier belts, is shown. In accordance with the broader aspects of the invention, the general relationship shown in Figure 1 is adhered to with either embodiment of the drive unit, so that a plurality of drive units 16 are provided for the carrier belt 10. To provide a concave carrier belt, the end rollers 12 suitably may be cylindrical rollers, but the support rollers 14 for the upper run of the belt comprise two spaced parallel rows of oppositely inclined rollers so that the upper run of the belt 10 is required to assume a dished or concave configuration. To maintain the concavity of the belt 10, the traction or drive belt of the drive units must be disposed to conform to the belt 10. In Figure 4, we have shown an embodiment of the drive unit of the present invention, preferred for driving concave carrier belts, which is generally similar to the drive unit previously described. In Figure 4, parts similar to parts and elements of the drive unit previously described are indicated by like reference numerals with the suffix "a."

As shown, each of the drive units comprises a pair of endless traction belts 20a, each suitably reaved and guided by a pair of end rollers 22a. One roller of each pair may suitably be provided with substantially the same drive means as previously described, wherein an electric motor 28 is provided. To drive both of the belts 26a, an end roller 22a of each belt may be provided with a separate drive means, the motors being synchronized, or the belts may be driven by a single motor through two pulley arrangements or by a suitable driving connection between adjacent rollers 22a. The rollers 22a are mounted on inclined axes, the same as the rollers 14, so that the two belts 20a are inclined toward one another and maintain the concavity of the carrier belt 10. Each of the belts 20a is so disposed that one run thereof engages the upper run of the carrier belt 10, as is shown in Figure 4.

Between the end or main rollers 22a, each traction belt 20a is supported by a plurality of rollers 34a. The rollers 34a are preferably disposed on an inclination the same as that of the rollers 22a and 14 so as to properly support and guide the respective traction belts 20a and the carrier belt 10. The provision of oppositely inclined side rollers 34a establishes and maintains the dished or curved configuration of the carrier belt 10, so that material carried thereby will have little tendency to move laterally off the belt. Disposed immediately below each of the inclined side rollers 34a is an electro-magnetic coil 38a, substantially identical to the electro-magnets previously described. Each of the electro-magnets is mounted upon and magnetically connected at one side thereof by means of an iron bridge 40a, which is provided with an arcuate upper face conforming substantially to the curvature of the belt 10. It will be appreciated that the carrier belt 10 and the drive units 16 may be supported in any conventional manner in the relationships stated, as outlined hereinbefore.

In many installations it may prove desirable to provide a central support in the drive units for the carrier belt 10. To this end, we preferably provide a plurality of horizontally disposed supporting rollers 42a disposed in a row centrally of and parallel to the rows of rollers 34a. If desired, the rollers 42a may suitably guide a supporting belt 44a reaved over the rollers 42a and suitable end rollers 46a. Likewise, the embodiment of the invention shown in Figure 3 and described hereinbefore may include similar supporting means. The rollers 42a and 46a may suitably be journaled on axles common to the axles of the rollers 34a and 22a, respectively, or may be supported in other conventional manners.

To provide a magnetic attraction between the carrier belt 10 and the traction belts 20a of each unit, the belts 10 and 20a are preferably formed of steel of a high magnetic permeability, the side rollers 34a and the iron bridge 40a are also magnetically permeable, and the middle rollers 42a and the belt 44a are non-magnetic. Hereinafter, for convenience, the magnetically permeable belts 10 and 20a, rollers 34a and bridge 40a are sometimes referred to as "magnetic." As will be apparent, the magnetic circuit or flux path between the electro-magnets 38a, at one side thereof, will be through the iron bridge 40a and, at the opposite side thereof, will pass directly through the carrier belt 10 and the traction belts 20a to effectively lock the traction belts to the carrier belt for simultaneous movement. In view of the foregoing, it will be appreciated that the middle row of rollers 42a and the belt 44a merely comprise supporting means and are not essential to the magnetic drive of the present invention. Accordingly, it will be appreciated that the second embodiment of the present invention essentially comprises a pair of steel traction belts adapted to be brought into engagement with a steel carrier belt, supporting means for the belts and spaced magnetic means having a flux path therebetween passing through the traction belts and the carrier belt.

While the relationship described and shown is preferably adhered to, it will be appreciated that the belts 20a could comprise a single belt reaved over the various pulleys 22a and 34a.

From the foregoing, it will be appreciated that the present invention provides a conveyor belt and a plurality of individual drive units for driving the conveyor belt, each of the units being adapted for association with and disassociation from the conveyor belt and adapted for separate replacement or use. By providing a plurality of drive units, the tractive effort exerted on the carrier belt is uniformly distributed throughout the length of the belt so that same is positively driven and so that the belt is not subject to the tensile load normally exerted on conveyor belts by virtue of driving same at a localized point, as has been customary. By providing individual drive units adapted to be associated in any number with a conveyor belt, the present invention is particularly adapted for the driving of extremely long runs of conveyor belt, which may be of any length desired in any particular installation, the number of units being determined by the length of the carrying run of the belt and the character of the material to be transferred by the carrier belt.

While we have described what we regard to be preferred embodiments of our invention, it will be apparent that various changes, rearrangements and modifications may be made therein without departing from the spirit and scope of the present invention as defined by the appended claims.

We claim:

1. A conveyor comprising an endless steel carrier belt of high permeability and a plurality of drive units therefor, each unit comprising an endless steel traction belt of high permeability having one run thereof in engagement with said carrier belt, a pair of rollers supporting said traction belt, means for driving one of said rollers to drive said traction belt, a plurality of supporting rollers disposed in two spaced parallel rows to the inner side of said one run of said traction belt and at opposite sides thereof, each of said rows of supporting rollers being inclined with respect to one another and each of the rollers in the rows being formed of magnetic material, an electro-magnet disposed adjacent each of the supporting rollers in said rows, and an iron bridge supporting and magnetically connecting said electro-magnets at one side thereof, whereby said electro-magnets have a flux path through the supporting rollers in said rows and through said traction belt and said carrier belt to magnetically connect said belts, whereby said carrier belt is driven by the traction belts of said drive units.

2. A magnetic drive unit for a conveyor belt formed of magnetic material, said unit comprising an endless steel traction belt of high permeability having one run thereof adapted to be in engagement with the conveyor belt, a pair of rollers supporting said traction belt, means for driving one of said rollers to drive said traction belt, a plurality of rollers disposed in three spaced parallel rows to the inner side of said one run of said traction belt, the outer rows of said supporting rollers being inclined with respect to one another and each of the rollers in the rows being formed of magnetic material, the rollers of the middle row being disposed substantially parallel to the mean plane of said belt and being non-magnetic, an electro-magnet disposed adjacent each of the supporting rollers in the outer rows, and an iron bridge supporting and magnetically connecting said electro-magnets at one side thereof, whereby said electro-magnets have a flux path through the supporting rollers in the outer rows and through said traction belt whereby the traction belt is adapted to be magnetically connected with the conveyor belt.

3. The drive unit of claim 2 wherein the surface of each electro-magnet adjacent a roller is concentric with the surface of the roller and wherein the surface of the bridge on that side which is closer to the belt substantially conforms to the surface presented by the group of rollers, with the longitudinal axis of each electro-magnet being normal to the axis of its adjacent roller.

References Cited in the file of this patent

UNITED STATES PATENTS

| Number | Name | Date |
|---|---|---|
| 996,022 | Lindhard | June 20, 1911 |
| 1,561,063 | Dunlap | Nov. 10, 1925 |
| 2,594,342 | Pettyjohn | Apr. 29, 1952 |
| 2,655,248 | Buccicone | Oct. 13, 1953 |

FOREIGN PATENTS

| Number | Country | Date |
|---|---|---|
| 235,207 | Great Britain | Nov. 26, 1925 |